United States Patent [19]

Chevis et al.

[11] Patent Number: 4,854,126

[45] Date of Patent: Aug. 8, 1989

[54] CENTRIFUGAL COMPRESSOR DIFFUSER SYSTEM AND METHOD OF MAKING SAME

[75] Inventors: Robert W. Chevis, Conventry, England; Reginald G. Keetley, Daphne, Ala.

[73] Assignee: Teledyne Industries, Inc., Los Angeles, Calif.

[21] Appl. No.: 115,599

[22] Filed: Oct. 29, 1987

Related U.S. Application Data

[63] Continuation of Ser. No. 728,038, Apr. 29, 1985, abandoned.

[51] Int. Cl.[4] .................................... F02C 1/00

[52] U.S. Cl. ........................ 60/726; 417/409; 415/208.3

[58] Field of Search ............... 60/726; 417/405–409; 415/210, 211

[56] References Cited

U.S. PATENT DOCUMENTS 3,832,089 8/1974 Moellmann ..................... 415/211
3,904,312 9/1975 Exley ........................... 415/211
4,455,121 6/1984 Jen ............................. 415/211

*Primary Examiner*—Louis J. Casaregola
*Assistant Examiner*—Timothy S. Thorpe
*Attorney, Agent, or Firm*—Gifford, Groh, Sheridan, Sprinkle and Dolgorukov

[57] ABSTRACT

A one-piece housing casting comprising a hub adapted to receive a turbine shaft therethrough and a radially extending flange on the outer periphery of the hub. The flange includes radially aligned annular surface portion and means for spacing the surface a predetermined distance from a radially aligned housing wall close to the outlet of the centrifugal compressor. The flange also includes an axially extended portion having an axially extended surface and means for spacing the surface away from an axially extending surface on a turbine housing wall to define a passage therebetween. Preferably, the means for spacing the walls apart from the turbine housing wall surfaces comprise diffuser vanes integrally formed on the radially and axially aligned surfaces of the flange of the diffuser member.

6 Claims, 2 Drawing Sheets

CENTRIFUGAL COMPRESSOR DIFFUSER SYSTEM AND METHOD OF MAKING SAME

This is a continuation of co-pending application Ser. No. 728,038 filed on Apr. 29, 1985, now abandoned.

BACKGROUND OF THE INVENTION

I. Field of the Present Invention

The present invention relates generally to turbine engine constructions and, more particularly, to the structure of a diffuser system disposed downstream of centrifugal compressor in a turbine engine.

II. Description of the Prior Art

In a turbine engine having a centrifugal compressor, flud is discharged under pressure radially outwardly from the rotating shaft of the turbine. The turbine engine housing includes passages which direct the fluid toward a combustor chamber formed in the housing. In order to obtain controlled flow characteristics in the discharged fluid so that the fluid mixes and ignites efficiently and completely in the combustor chamber, a diffuser system is often employed in the passage between the centrifugal compressor and the combustion chamber.

Typically the diffuser comprises a pair of annular, radially extending walls a fluid flow passage therebetween sized to provide the desired flow characteristics. In addition, vanes may extend across the passageway between the radially extending surfaces to further control the direction and velocity and flow envelope of the fluid flow from the diffuser. However, the flow pattern created by the diffuser can be modified or destroyed if the passageway changes direction. Thus, unless the combustor chamber is located radially outwardly from the diffuser passageway, the turbine engine will not perform as efficiently as intended by incorporating the radial diffuser.

Accordingly, in the design of a turbine engine which is to be enclosed in a narrow turbine housing, it would be advantageous to place the combustor chamber axially downstream from the centrifugal compressor to provide a turbine engine with a minimum breadth. In such a case, it will be understood that the fluid discharged by the compressor must be axially displaced toward the combustor chamber. During this transfer to the combustor chamber, it would be advantageous to provide additional means for controlling and directing the flow of fluid into the combustor chamber so that the fluid is well dispersed in the combustor chamber. Previously, such control was provided by swirl plate constructions incorporated in the walls of the combustor housing. In such a device, the combustor chamber must be specially constructed and thus adds to the cost and complexity of the turbine engine construction. On the other hand, the housing walls defining the flow passages could also be specially constructed to include diffuser means which would also substantially increase the cost and complexity of the turbine engine.

SUMMARY OF THE PRESENT INVENTION

The present invention overcomes the above-mentioned disadvantages by providing a diffuser system with a one-piece casting including a radial surface portion and an axial surface portion which cooperate with the intake structure and the casting walls to define radial and axial passageways in a turbine casing construction. Preferably, both the radial surface portion and the axial surface portion include flow directing vanes which are integrally cast with the cast housing. Moreover, the cast housing is attached to the intake structure and includes an annular central hub which enables the cast housing to be slid into the turbine casing about the shaft of the turbine engine and thereby positioned in the turbine engine.

The one-piece cast housing generally comprises an annular hub portion whose inner bore is defined by appropriate surfaces such as lands for engagement with bearings which support the turbine shaft. The outer surface of the hub includes appropriate means or orifices for the connection of cooling or lubrication conduits which enable the mechanisms disposed in the interior of the hub to be properly cooled and lubricated. In any event, a radial flange extends outwardly from the annular hub and includes a radially extending surface portion disposed outwardly from the annular hub. An axially extending surface portion extends rearwardly from the radially extending surface portion at the outermost end of the radially extending surface portion.

Diffuser vanes are preferably integrally cast to extend axially outward from the radially extending surface portion. Similarly, vanes extend radially outwardly from the axially extending surface portion of the casting. The outermost edges of the diffuser vanes abut against portions of turbine housing walls to thereby define the fluid passageway intermediate the cast housing and the turbine housing walls with means for controlling the flow of fluid being delivered from the centrifugal compressor to the combustor chamber of the turbine engine.

Thus, the present invention provides a compressor diffuser system with a radial diffuser construction which also incorporates means for forming an axial passage toward a combustor which is axially spaced from centrifugal compressor. It is, therefore, especially convenient for use in small turbine engines. In addition, since the diffuser vanes are formed together with the surfaces which form fluid passages in the housing, complex and time consuming installation of separately formed and machined diffuser vanes is avoided. In addition, since the cast housing includes axial diffuser vanes, an appropriate swirl or anti-swirl component can be introduced to the fluid flow into the combustor chamber without the need for complex construction of the combustor chamber walls or the turbine housing.

BRIEF DESCRIPTION OF THE DRAWINGS

The present invention will be more clearly understood by reference to the following detailed description of the preferred embodiment of the present invention, when road in conjunction with the accompanying drawing in which like reference characters refer to like parts throughout the several views, and in which.

DETAILED DESCRIPTION OF THE PREFERRED EMBODIMENT OF THE PRESENT INVENTION

Figure 2:
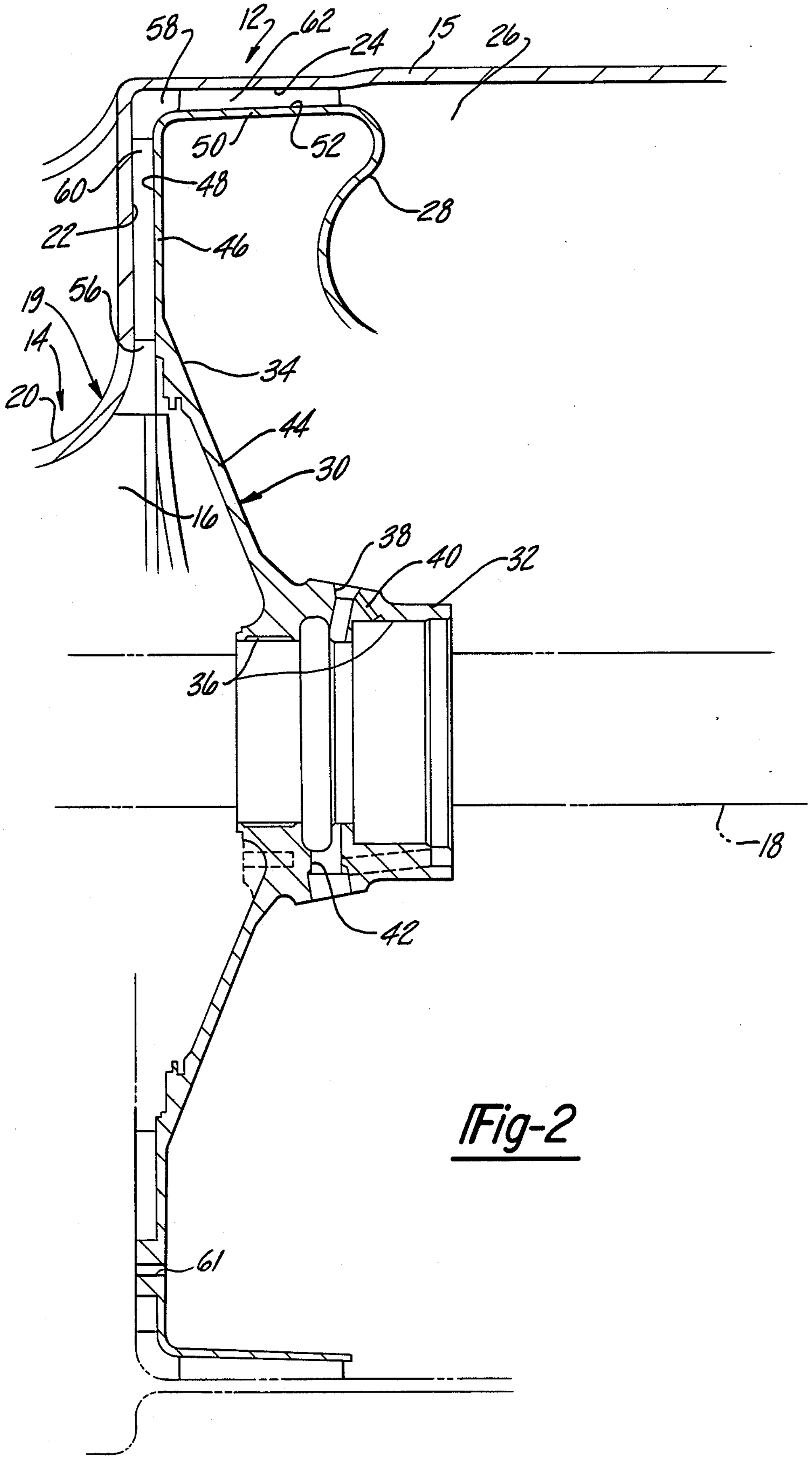
FIG. 2 is a sectional elevation taken substantially along the line 2—2 of FIG. 1 and including environmental portions of the turbine engine.

Referring first to FIG. 2, a turbine engine 12 includes a centrifugal compressor 14 having compressor blades 16 secured for rotation to the turbine shaft 18. The compressor 14 is confined within the intake structure 19 having a curved portion 20 conforming with the curved configuration of the tips of the blades 16 and which includes a radially extending, planar surface portion 22 extending radially outwardly from the tips of the final stage of the compressor blades 16. The turbine casing 15 also includes an axially extending wall portion 24 at the outermost end of radial surface portion 22 which extends rearwardly toward the combustor chamber 26 defined by appropriate housing walls 28. While the turbine engine 12 includes a centrifugal compressor 14 to obtain the advantage of imparting centrifugal force to the fluid in a turbine engine, the combustor chamber 26 is spaced axially away from the centrifugal compressor 14 so that the turbine casing 15 is narrow and provides a compact turbine engine construction. The centrifugal compressor 14 fluidly communicates with the compressor chamber through passages formed by cast housing 30.

Cast housing 30 comprises a one-piece cast housing in which all of the important features are cast integrally therewith and thereafter machined to appropriate finished surface tolerances. The cast housing 30 comprises an annular hub portion 32 and a radial flange 34 extending radially outwardly from the hub. The peripheral wall defining the bore in the hub 32 is provided with appropriate lands, such as land surface 36, for bearing constructions which support the hub about the rotating turbine shaft 18. In addition, the hub also includes appropriate passages such as passages 38 and 40 which permit lubricant or coolant to be introduced to the bearing structures contained within the hub 32, as well as appropriate outlet passages such as the passage 42. In any event, it will be seen that the cast housing 30 is secured in the turbine engine 12 by installation on the intake support structure 19 as will be described in detail hereinafter.

The radial flange 34 of the diffuser member 30 includes a cone portion 44 extending radially outwardly from the periphery of hub 32 which angles outwardly towards a position axially spaced from the hub 32. A radially extending wall portion 46 of flange 34 extends outwardly from the outermost end of the web and includes a planar, substantially annular wall surface 48 facing forwardly of the hub 32. The radial wall portion 46 is joined at its outermost end to an axially extending cylindrical wall portion 50 having an outer surface portion 52 extending axially toward the hub and facing radially outwardly from the hub. As best shown in FIG. 2, wall surface 48 extends radially outwardly above the outlet of the last compressor stage blade 16, and together with intake structure wall 22 defines a radial diffuser passage 56 therebetween. The axially extending surface portion 52 extends from the radial diffuser passage 56 toward the combuster chamber 26 and in conjunction with the turbine casing wall surface 24 defines the passageway 58 therebetween in fluid communication with the combustor chamber 26.

Figure 1:
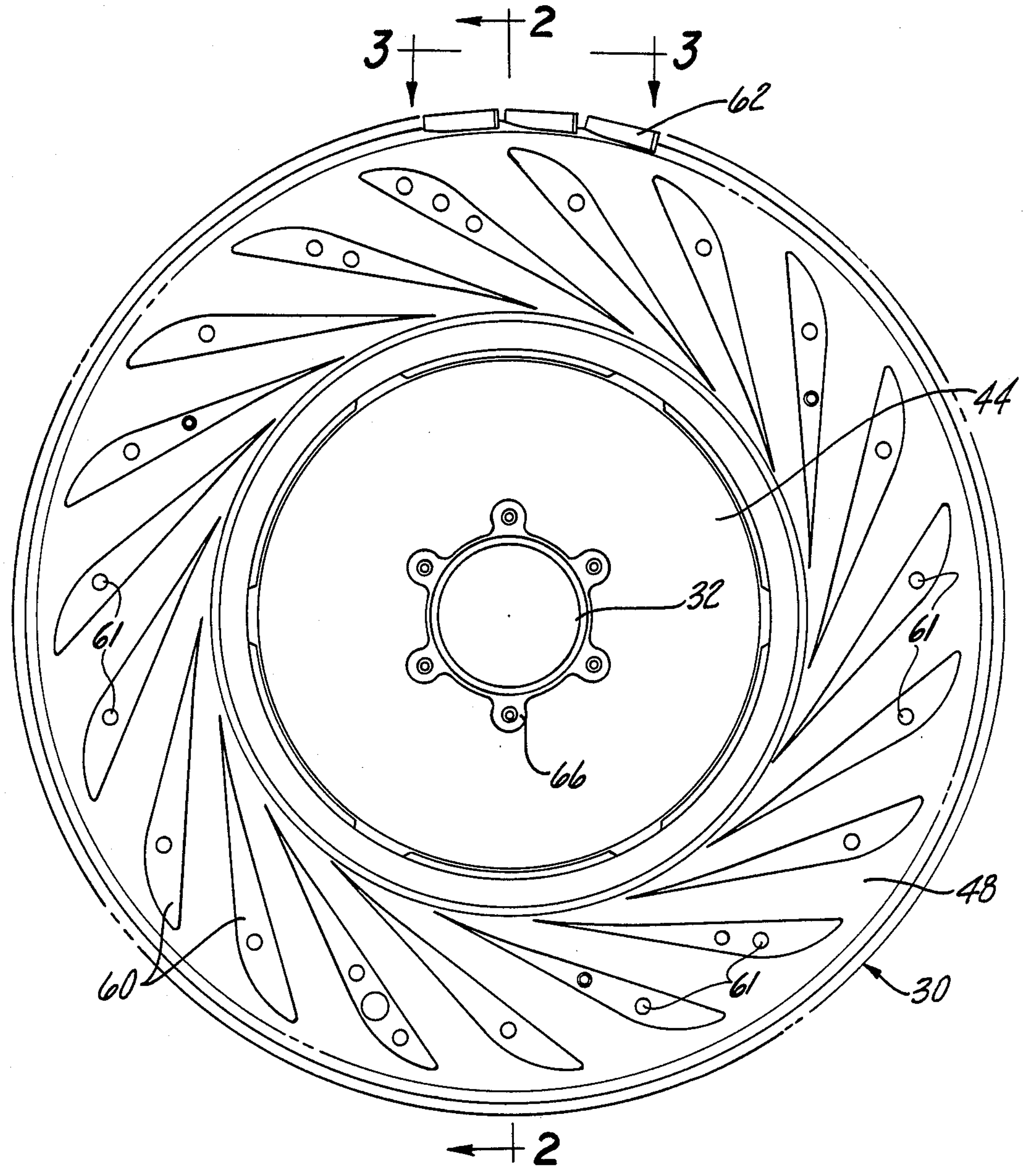
FIG. 1 is a front elevational view of a radial diffuser casting according to the present invention.

A plurality of radial diffuser 60 are integrally formed on the annular surface 48. As best shown in FIG. 1 the diffuser vanes 60 are cast in the air foil shape which controls the flow characteristics of the fluid discharged from the outlet of the centrifugal compressor 14. Since the radial diffuser vanes 60 are integrally formed with and extend from the surface 48, this construction eliminates the need for sealing or otherwise interlocking the diffuser means to that side wall of the radial diffuser passage 56. Of course, various other shapes of vanes are also within the scope of the present invention.

Figure 3:
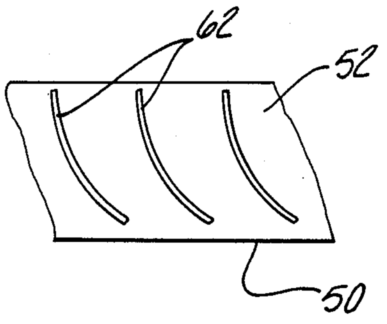
FIG. 3 is a top plan view of a portion of the device taken substantially from the view line 3—3 in FIG. 1.

A plurality of axial diffuser vanes 62 are integrally formed on the axially extending surface 52 and extend radially outwardly from the surface. As best shown in FIG. 3, the axial diffuser vanes 62 are cast as curved wall portions which reduce the swirl component from the radial diffuser vanes, thereby straightening the flow of fluid introduced to the combustor chamber 26. Of course, various other shapes for the vanes can also be employed.

The outer end surfaces of the radial and axial vanes 60 and 62 abut against and seal with the adjacent intake structure and turbine casing surfaces 22 and 24, respectively, so that the diffuser passages 56 and 58 form a closed passageway between the outlet of the centrifugal compressor 14 and the combustor chamber 26. Appropriate means are also provided for locking the member 30 in its position within the turbine engine. For example, a plurality of axial throughbores 61 are formed in the radial vanes 60. Bolts can then be inserted through the throughbores 61 and fastened to the intake structure 19 to secure the cast housing 30 in the turbine engine. Of course, surfaces of the diffuser vanes 60, 62 as well as the surfaces 48 and 52 are finished to proper tolerances by machining the surfaces after the entire member 30 has been cast.

Having thus described the important structural features of the present invention, the operation of the device is easily described. Once the centrifugal compressor has been installed on a turbine shaft and the bearings are secured in the hub 32, the cast and machined cast housing 30 is positioned over the turbine shaft and slid into position so that radially extending annular surface 48 is spaced apart a predetermined distance from the intake structure radial surface portion 22 so as to define the radial diffuser passage 56 therebetween communicating with the outlet of the last stage compressor blade 16. At the same time, the axially extending surface 52 will be spaced apart a predetermined distance from the turbine casing wall surface 24 and defines a fluid passage communicating between the radial diffuser passage 56 and combustor chamber 26. In the preferred embodiment, the width of the diffuser vanes 60 and 62 provide the predetermined spacing between the wall surfaces. It will be understood that securing of the cast housing 30 to the intake structure housing provides a sturdy support for the turbine shaft in the hub 32. The hub 32 can also be bolted to turbine casing structure through the apertured flanges 66.

Thus, the present invention provides a lightweight diffuser system including means for axially transferring fluid from the compressor to the combustor of a small turbine engine in which the combustor is located in a position axially spaced from the centrifugal compressor. Since the cast housing 30 is made in one piece, it is substantially less complex to install than previously known two stage diffusers. In addition, since diffuser vanes are formed on one of the peripheral surfaces of the diffuser passageways, separate production and complex installation of individual vanes is avoided. Nevertheless, it will be understood that the diffuser vanes can be machined to an appropriate shape within appropriate tolerances. In addition, the cast housing 30 provides additional support for the turbine shaft within the turbine engine and, thus, serves to reduce the weight of supporting structure for the turbine shaft within the turbine housing.

Having thus described my invention, many modifications thereto will become apparent to those skilled in the art to which it pertains without departing from the scope and spirit of the present invention as defined in the appended claims.

What is claimed is:

1. In a turbine engine having a turbine casing, a turbine shaft disposed in said casing, a centrifugal compressor secured to said shaft, and a combustor chamber contained in said casing; a diffuser structure fluidly connecting said compressor and said combustor chamber, comprising:

an annular hub receiving said shaft therein;

a radially extending surface portion on said turbine casing, and an axially extending surface portion on said turbine casing depending from said radially extending surface portion;

a flange extending radially from said hub possessing annular radially extending surface and an annular axially extending surface, each of said radially and axially extending flange surfaces facing towards said radially and axially extending surface portions of said turbine casing, respectively; said flange surfaces and casing surface portions together defining a diffuser passageway therebetween, open to said compressor and said combustor chamber;

a plurality of first diffuser vanes disposed on said radially extending flange surface, extending to said radially extending surface portion of said turbine casing; and a plurality of said diffuser vanes disposed on said axially extending flange surface, extending to said axially extending surface portion of said turbine casing;

wherein said hub, said flange, and said first and second plurality of vanes are of a one piece construction; and further comprising means for removably securing said continuously composed hub, flange, and vanes to said turbine casing;

wherein said first and second plurality of vanes each include end surfaces opposite said radially and axially extending flange surfaces, respectively, said vane end surfaces abutting against and sealing with said respective radially and axially extending surface portions of said turbine casing when said securing means secures said continuously composed hub, flange and vanes to said turbine casing; said continuously composed hub, flange, and vanes being axially slidable with respect to said casing when not secured to said casing by said securing means; and wherein said securing means comprises an axially aligned throughbore in at least some of said first diffuser vanes and a fastener connected to said intake portion disposed in each throughbore.

2. The invention according to claim 1, wherein said hub includes an axial end axially spaced from said radially extending surface of said flange, said radially aligned surface includes a radially inner end, and said flange includes a truncated one extending between said end of said hub and said end of said radially aligned surface.

3. The invention according to claim 1, wherein each of said first diffuser vanes comprises an airfoil.

4. The invention according to claim 1, wherein each of said second diffuser vanes comprises a curved wall.

5. The invention according to claim 1, wherein said continuous material is a material having a cast structure.

6. The invention according to claim 1, wherein said turbine casing includes an intake portion incorporating said radially extending surface portion, and said securing means secures said continuously composed hub, flange and vanes to said intake portion.

* * * * *